United States Patent
Noh et al.

(10) Patent No.: US 9,604,667 B2
(45) Date of Patent: Mar. 28, 2017

(54) METHOD OF DETECTING DEVIATION OF TRAVEL PATH OF A VEHICLE

(71) Applicant: Hyundai Motor Company, Seoul (KR)

(72) Inventors: Yang Soo Noh, Whasung-Si (KR); Min Woo Han, Whasung-Si (KR); Hyun Sung, Whasung-Si (KR); Jang Hun Jeong, Wasung-Si (KR)

(73) Assignee: Hyundai Motor Company, Seoul (KR)

( * ) Notice: Subject to any disclaimer, the term of this patent is extended or adjusted under 35 U.S.C. 154(b) by 150 days.

(21) Appl. No.: 14/509,855

(22) Filed: Oct. 8, 2014

(65) Prior Publication Data

US 2015/0183458 A1 Jul. 2, 2015

(30) Foreign Application Priority Data

Dec. 30, 2013 (KR) ........................ 10-2013-0167900

(51) Int. Cl.
*B62D 5/04* (2006.01)
*B62D 15/02* (2006.01)

(52) U.S. Cl.
CPC ......... *B62D 5/0487* (2013.01); *B62D 5/0484* (2013.01); *B62D 15/025* (2013.01)

(58) Field of Classification Search
None
See application file for complete search history.

(56) References Cited

U.S. PATENT DOCUMENTS

| | | |
|---|---|---|
| 5,912,539 A | 6/1999 | Sugitani et al. |
| 5,999,870 A | 12/1999 | Tatsumi et al. |
| 6,968,261 B2 * | 11/2005 | Ghoneim ............ B60G 17/0195 701/41 |
| 2003/0071587 A1 | 4/2003 | Suzuki et al. |
| 2003/0121717 A1 | 7/2003 | Tokumoto |
| 2008/0172153 A1 * | 7/2008 | Ozaki ................. B60T 8/17557 701/36 |
| 2008/0243339 A1 * | 10/2008 | Nishimori .............. B60G 7/003 701/41 |
| 2009/0048738 A1 * | 2/2009 | Iwazaki ............... B62D 15/025 701/44 |
| 2009/0212930 A1 * | 8/2009 | Pfeiffer .................. B60Q 9/008 340/435 |
| 2010/0004821 A1 * | 1/2010 | Buerkle ............... B62D 15/025 701/41 |
| 2012/0123643 A1 * | 5/2012 | Limpibuntering ..... B62D 1/286 701/42 |
| 2012/0145472 A1 | 6/2012 | Imamura et al. |

(Continued)

FOREIGN PATENT DOCUMENTS

KR 10-1449324 B1 10/2014

*Primary Examiner* — John R Olszewski
*Assistant Examiner* — Navid Ziaeianmehdizadeh
(74) *Attorney, Agent, or Firm* — Morgan, Lewis & Bockius LLP

(57) ABSTRACT

A method of detecting a deviation of a travel path of a vehicle, may include a first step of determining whether a steering torque of a driver and a motor torque of a motor driven power steering apparatus have different directions, a second step of determining whether the vehicle travels at a predetermined speed or higher, a third step of determining whether the motor torque has a predetermined magnitude or larger, and a fourth step of determining whether a change rate of a yaw rate may be a predetermined value or less.

6 Claims, 4 Drawing Sheets

(56) References Cited

U.S. PATENT DOCUMENTS

| | | | |
|---|---|---|---|
| 2012/0226416 A1 | 9/2012 | Lee | |
| 2013/0124047 A1* | 5/2013 | Lazic | B62D 15/025 701/42 |
| 2013/0173115 A1* | 7/2013 | Gunia | B62D 6/00 701/41 |
| 2013/0190985 A1* | 7/2013 | Nakano | B62D 6/00 701/41 |
| 2014/0360803 A1* | 12/2014 | Hori | B62D 5/0484 180/446 |
| 2015/0232124 A1* | 8/2015 | Takeda | B62D 15/025 701/42 |
| 2015/0329108 A1* | 11/2015 | Kodaira | B62D 15/025 701/41 |
| 2015/0375784 A1* | 12/2015 | Ogawa | B62D 15/025 701/41 |

* cited by examiner

METHOD OF DETECTING DEVIATION OF TRAVEL PATH OF A VEHICLE

CROSS-REFERENCE TO RELATED APPLICATION

The present application claims priority to Korean Patent Application No. 10-2013-0167900 filed on Dec. 30, 2013, the entire contents of which is incorporated herein for all purposes by this reference.

BACKGROUND OF THE INVENTION

Field of the Invention

The present disclosure relates to a method of detecting a deviation of a travel path of a vehicle which can prevent a traveling vehicle from deviating from a travel path irrespective of an intention of a driver by using state information of a motor driven power steering apparatus and the vehicle.

Description of Related Art

With the increasing electronization in vehicle components, there has been a growing interest on the functional safety of the vehicle increase, and vehicle related businesses take great interests in ISO26262, which is an international standard on the functional safeties of vehicles.

Accordingly, efforts to provide steering apparatuses satisfying ISO26262 have been focused to accelerate in the field of Motor Driven Power Steering (MDPS) apparatuses of vehicles.

According to the related art, breakdown detection performance has been sought to be increased when a breakdown occurs to secure the functional safety of a motor driven power steering apparatus, and problems which can be generated due to a breakdown of the motor driven power steering apparatus include no-steering (or locking).

The term "no steering" refers to a situation in which a steering torque of a driver and a motor torque are offset such that steering becomes impossible if the motor torque has the same magnitude as that of the steering torque of the driver in a direction opposite to that of the steering torque of the driver when the steering torque of the driver occurs for turning while the vehicle is driven at a predetermined speed or higher.

FIG. 1 is a view showing no steering occurring when a vehicle travels according to the related art.

As shown in FIG. 1, the motor driven power steering apparatus breaks down, the vehicle fails to turn but moves forwards when the driver desires to turn.

That is, if a breakdown such as no steering occurs in the motor driven power steering apparatus, the vehicle moving forwards at point 1 of FIG. 1 fails to turn but moves forwards due to a steering lock even if a turn has been attempted.

In this way, when a dangerous situation such as no steering occurs as the motor driven power steering apparatus breaks down during a travel of the vehicle, a big accident may occur as the vehicle deviates from a normal travel path irrespective of an intention of the driver.

According to a related art, by focusing only on the function of the motor driven power steering apparatus when the motor driven power steering apparatus breaks down, a current supplied to the motor of the steering apparatus is immediately interrupted to stop an operation of the motor driven power steering apparatus without considering a state of the vehicle when a breakdown, which is expected to be dangerous, occurs.

However, if a breakdown of the steering apparatus is detected by focusing only on the function of the motor driven power steering apparatus according to the present disclosure, a system for monitoring an added function when a function of the motor driven power steering apparatus is added is required so that the system becomes complex.

Further, since a phenomenon such as no steering occurs not necessarily when the motor driven power steering apparatus breaks down, there is a need to consider a state of the vehicle in order to accurately detect a phenomenon such no steering.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of detecting a deviation of a travel path of a vehicle which can prevent a traveling vehicle from deviating from a travel path irrespective of an intention of a driver by using state information of a motor driven power steering apparatus and the vehicle.

In accordance with an aspect of the present disclosure, a method of detecting a deviation of a travel path of a vehicle, may include a first step of determining whether a steering torque of a driver and a motor torque of a motor driven power steering apparatus may have different directions, a second step of determining whether the vehicle travels at a predetermined speed or higher, a third step of determining whether the motor torque may have a predetermined magnitude or larger, and a fourth step of determining whether a change rate of a yaw rate is a predetermined value or less.

The method may further may include a fifth step of determining whether a Lane Keeping Assist System (LKAS) is normally operated when the LKAS is mounted to the vehicle.

When all the first, second, third, and fourth steps are satisfied, it is determined that the deviation of the travel path of the vehicle is generated when the driver generates the steering torque for turning.

When all the first, second, third, and fourth steps are satisfied, it is determined that no steering of the vehicle occurs.

When all the first, second, third, and fourth steps are satisfied, it is determined that the deviation of the travel path of the vehicle is generated and a motor for the motor driven power steering apparatus is switched off by interrupting a current supplied to the motor.

In the first step, when a value obtained by adding the steering torque of the driver and the motor torque is less than 0, it is determined that the steering torque of the driver and the motor torque may have different directions.

In the fourth step, when the motor torque may have a predetermined magnitude or larger, it is determined that the vehicle travels straight forwards when the change rate of the yaw rate is the predetermined value or less.

In the fourth step, when the motor torque may have a predetermined magnitude or larger, it is determined that the vehicle travels straight forwards when a value obtained by differentiating the yaw rate is a predetermined value or less.

The present disclosure can show the following effects.

First, deviation of a vehicle from a travel path and a disastrous situation can be avoided by accurately detecting and preventing no steering by using state information of a motor driven power steering apparatus and the vehicle.

Second, the functional safety of a motor driven power steering apparatus can be secured by switching off a motor of a motor driven power steering apparatus when no steering occurs.

Third, travel safety may be secured by interrupting a current applied to a motor for a steering apparatus to convert the state of the vehicle into a manual steering state when no steering is detected.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
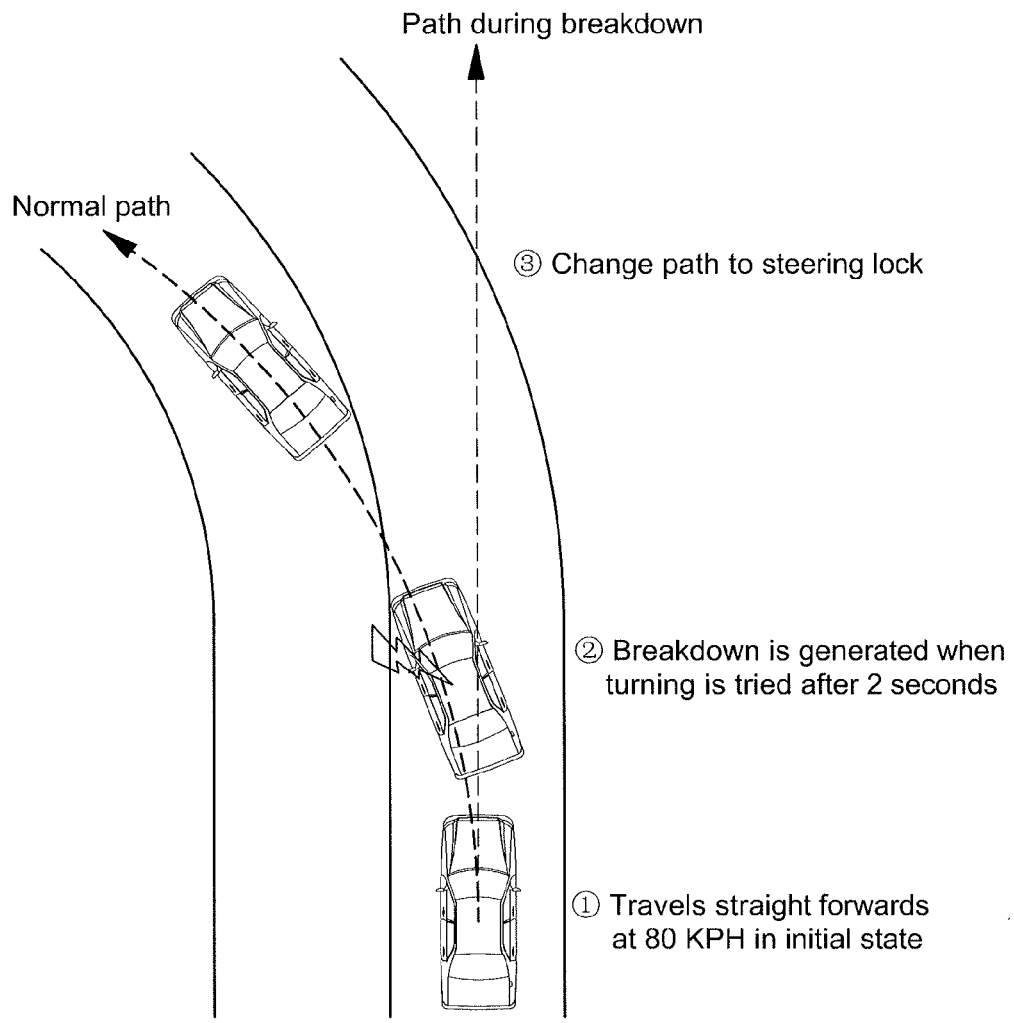
FIG. 1 is a view showing no steering occurring when a vehicle travels according to the related art.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present disclosure will be described in detail so that those skilled in the art to which the present disclosure pertains can easily carry out the present disclosure.

The present disclosure relates to a method for detecting a dangerous situation including disabling of steering of a vehicle such as no steering which can be caused by a breakdown of a motor driven power steering apparatus in an early stage to prevent the disabling of steering of the vehicle.

In general, a motor driven power steering apparatus operates a motor according to an angle change or a torque change of a steering wheel to allow the driver to easily change a travel direction of the vehicle if the steering wheel is operated during a travel of the vehicle.

That is, in the motor driven power steering apparatus, a torque sensor detects a manipulation of a steering wheel if the driver manipulates the steering wheel, an electronic control unit (MDPS ECU) transfers a command corresponding to a steering direction of the steering wheel and a value of a steering torque to a motor, and a motor is operated in response to the command to move a shaft of a front wheel of the vehicle to allow the driver to easily change a travel direction of the vehicle.

Figure 2:
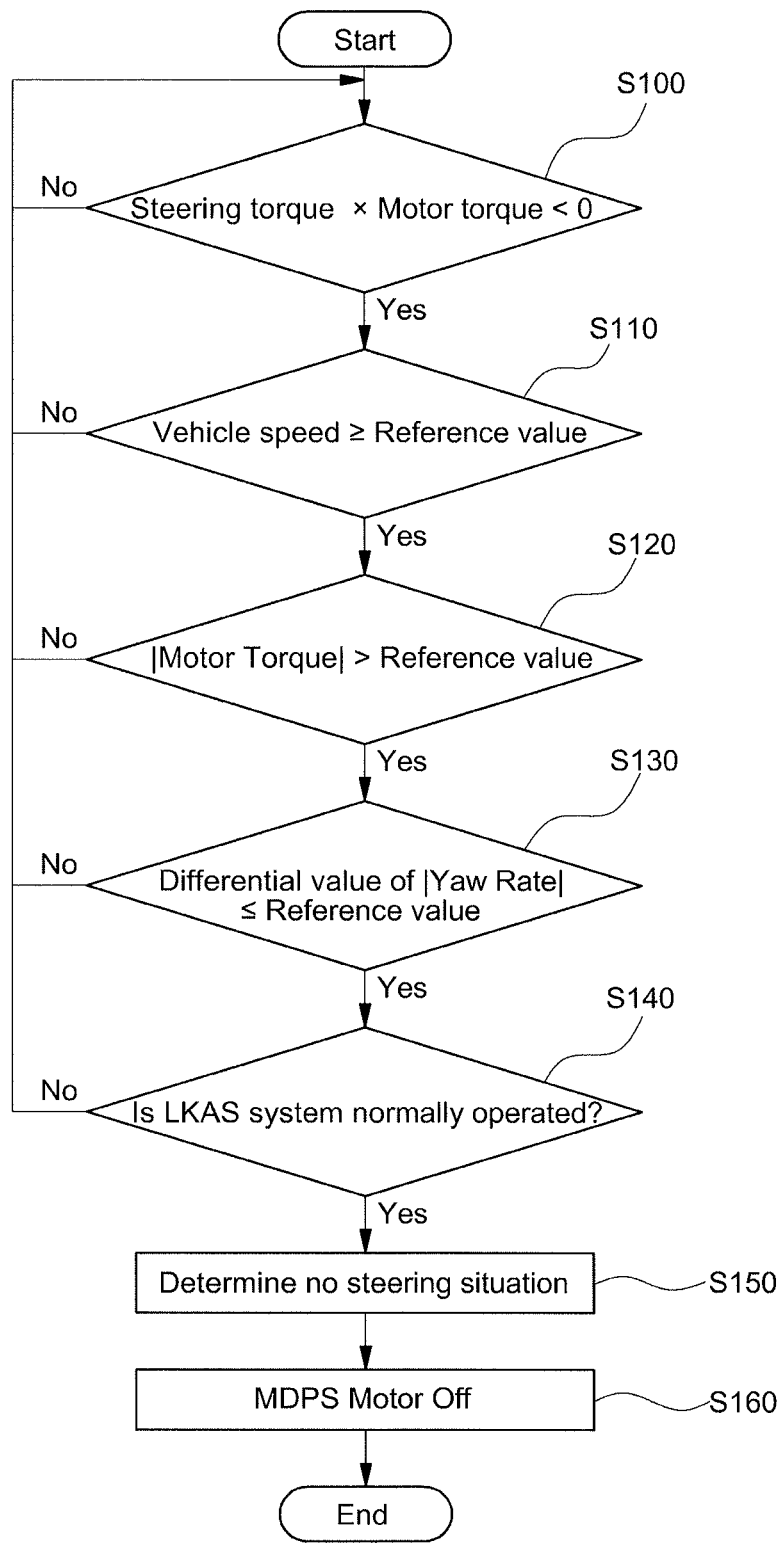
FIG. 2 is a flowchart showing a method of detecting a deviation of a travel path of a vehicle according to the present disclosure.

Referring to FIG. 2, in the method of detecting a deviation of a travel path of a vehicle according to the present disclosure, first, a direction of a steering torque of the driver or a steering torque of the steering wheel is compared with a direction of a motor torque to determine whether the directions of the two torques are the same or different.

The steering torque of the driver is a torque value generated when the driver manipulates the steering wheel in a desired direction during a travel of the vehicle, and the motor torque is a torque value of a motor for a motor driven power steering apparatus.

A torque sensor is mounted to the motor driven power steering apparatus of a vehicle, so that if the driver manipulates the steering wheel, the torque sensor detects a steering torque of the driver according to a steering intention of the driver.

As described above, if the vehicle is brought into a no steering state, the steering torque of the driver and the motor torque are generated in opposite directions.

Thus, a value obtained by adding the steering torque of the driver and the motor torque may be compared with 0 to compare the directions of the steering torque of the driver and the motor torque, in which case if the value obtained by adding the steering torque of the driver and the motor torque is 0, it is determined that the two torques have values of different directions, that is, that the steering torque of the driver and the motor torque are generated in opposite directions.

As described above, since no steering of the vehicle is generated in a situation where the vehicle travels at a predetermined speed or higher, it is determined whether the vehicle travels at the predetermined speed or higher (S110).

If the motor driven power steering apparatus breaks down while the vehicle travels at a predetermined speed or higher, it may be determined that a dangerous situation such as no steering occurs.

Accordingly, in order to determine a current travel speed of the vehicle, that is, in order to determine whether the vehicle travels at a predetermined speed or higher, a current travel speed of the vehicle is compared with a preset reference vehicle speed.

The reference vehicle speed is a preset speed of the vehicle, and may be arbitrarily determined as a speed which should be treated more sensitively for detection of a breakdown of the motor driven power steering apparatus.

For example, since a breakdown of the motor driven power steering apparatus may influences no steering more severely during a high speed travel rather than during a low speed travel, the reference vehicle speed may be determined in this regard.

As described above, when the driver generates a steering torque for turning of the vehicle, a motor torque having the same magnitude as that of the steering torque of the driver in a direction opposite to that of the steering torque of the driver is generated, making steering according to a will of the driver impossible.

Thus, it is determined whether the motor torque of the motor driven steering apparatus is a predetermined magnitude or larger to detect no steering of the vehicle, and the motor torque is compared with a preset reference torque thereto (S120).

If it is determined that the magnitude of the motor torque is the reference torque or larger, that is, if the motor torque is a predetermined value or higher, it is determined whether a change rate of a yaw rate is a predetermined value or lower.

It is known that the yaw rate represents a speed at which a rotation angle (yaw angle) is changed around a vertical line passing through the center of the vehicle, and a yaw state of the vehicle may be determined through a change rate of the yaw rate, that is, a differential value of the yaw rate.

If the motor torque becomes a predetermined value or higher when the motor driven power steering apparatus is in a normal state, the change rate in a yaw rate becomes a predetermined value so that the vehicle turns.

Thus, if the change rate in a yaw rate is a predetermined value or lower when the motor torque is a predetermined value or higher, it may be determined that the vehicle travels straight forwards.

In order to determine the change rate in the yaw rate, a value obtained by differentiating the magnitude of the yaw rate is compared with a preset reference change value to determine whether the change rate in the yaw rate is a reference change value or lower (S130).

If a value obtained by differentiating the magnitude of the yaw rate is a preset reference change value or less under the condition in which the motor torque is a reference torque or higher, that is, if the value obtained by differentiating the magnitude of the yaw rate is a predetermined value or less, it may be determined that the vehicle travels straight forwards (S140).

If the conditions are satisfied, that is, all of a condition in which the motor torque is generated in a direction opposite to that of the steering torque of the driver, a condition in which the speed of the vehicle is a predetermined value (reference vehicle speed) or higher, a condition in which the magnitude of the motor torque is a predetermined value (reference torque) or higher, and a condition in which the change rate of the yaw rate is a predetermined value (reference change value) or lower are satisfied, it is determined that a travel path of the vehicle deviates due to a breakdown of the motor driven power steering apparatus when a steering torque of the driver is generated.

That is, if all the conditions are satisfied, it is determined that the vehicle fails to turn along a normal path and travels straight forwards to cause a dangerous situation in which the vehicle deviates from a normal travel path, and accordingly, it is determined that no steering occurs in the vehicle (S150).

Meanwhile, a Lane Keeping Assist System (LKAS) mounted to some vehicles is a system for preventing a vehicle from automatically deviating from a lane during a travel of the vehicle, and it is known that the LKAS has a function of distinguishing a lane by white lines or central lines with a sensor and manipulating a steering wheel to maintain the lane as well as informing the driver through vibrations of the steering wheel or an alarm sound when the vehicle deviates from the lane.

Thus, since the vehicle adopting the LKAS may generate no steering due to a breakdown of the LKAS, no steering due to an failure of the LKAS is excluded by determining a normal operation of the LKAS and detecting a no steering state due to a breakdown of the MDPS by the MDPS ECU only during a normal operation of the LKAS. That is, the vehicle adopting the LKAS detects no steering due to a breakdown of the MDPS only under a condition in which the LKAS is normally operated.

For reference, the LKAS ECU stops an operation of the LKAS when the LKAS is in an abnormal state.

In this way, if it is determined that the vehicle deviates from a normal travel path due to no steering as the motor driven power steering apparatus breaks down (S150), a current supplied to the motor for the motor driven power steering apparatus is interrupted to switch off the motor (S160) so that a travel safety is secured by converting the state of the vehicle into a manual steering state.

According to the present disclosure, the electronic control unit (for example, an MDPS ECU) mounted to a vehicle receives a signal for determining various conditions from the corresponding sensors and systems to detect a dangerous situation such as no steering occurring due to a breakdown of the motor driven steering apparatus.

Figure 3:
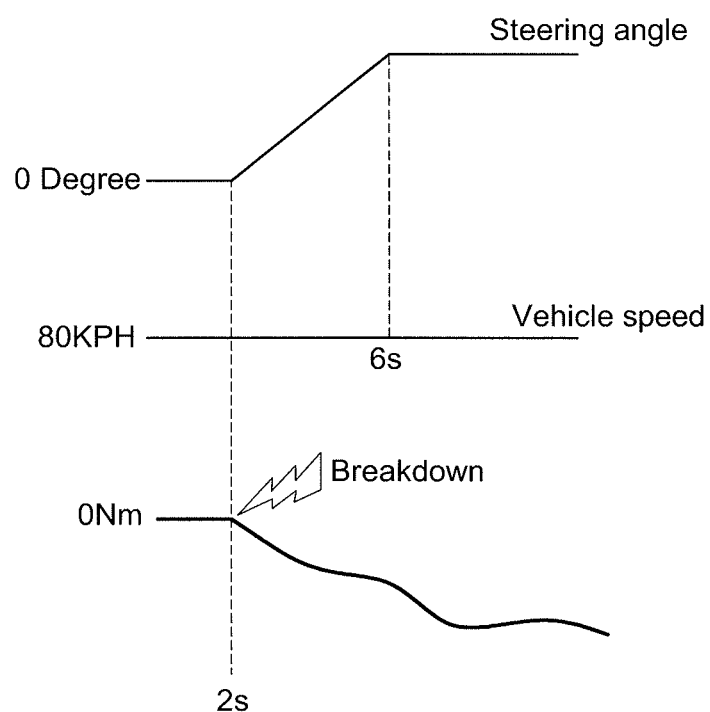
FIG. 3 is a view showing a simulation condition of no steering for verifying the method of detecting a deviation of a travel path of a vehicle according to the present disclosure.
Figure 4:
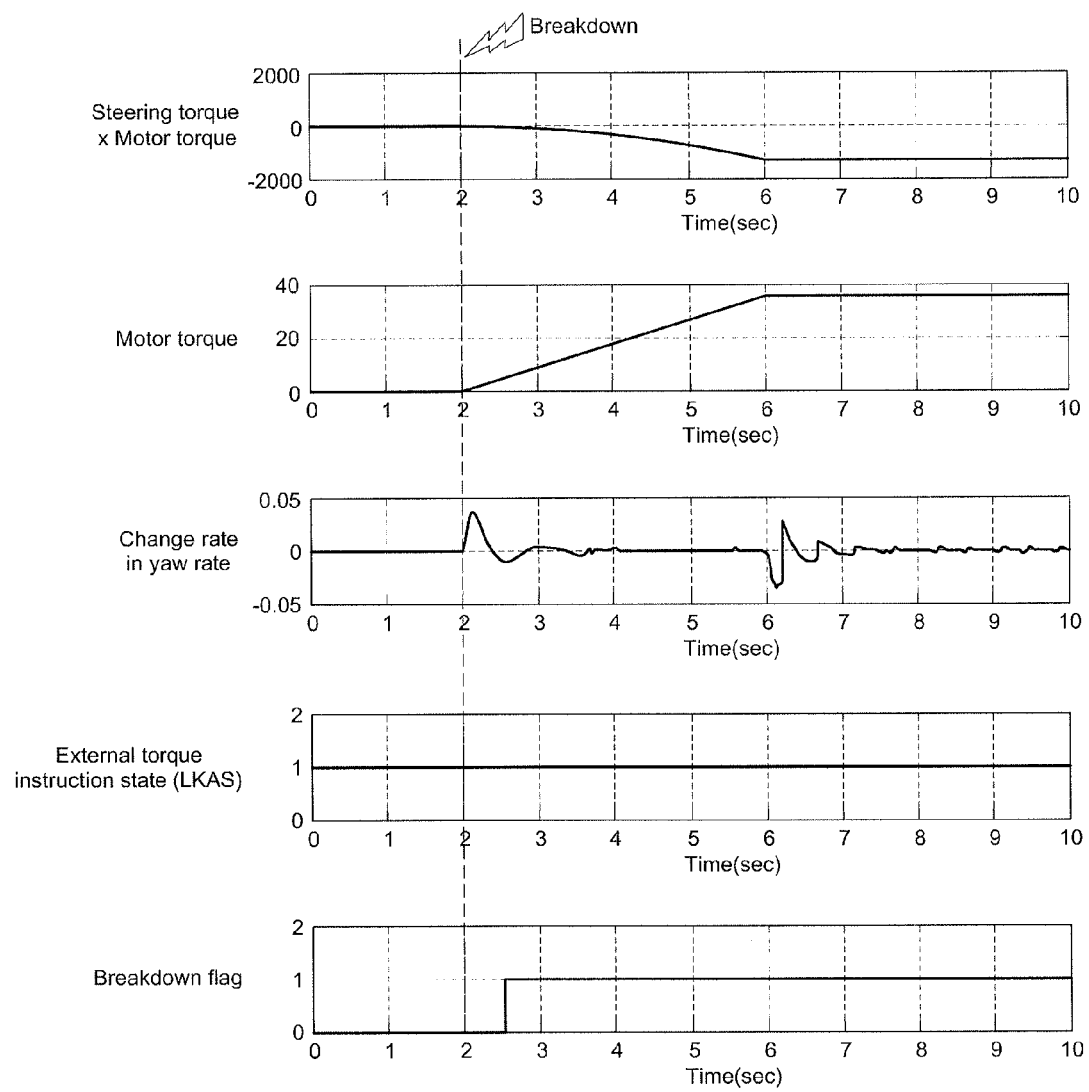
FIG. 4 is a view showing a simulation result according to the simulation condition of FIG. 3.

Meanwhile, in order to identify and verify accuracy and reliability of the method of detecting a deviation of a travel path of a vehicle according to the present disclosure, no steering is generated in a simulation condition as in FIG. 3 to obtain a simulation result as in FIG. 4.

Referring to FIG. 3, in the simulation condition, no steering was deduced by generating a breakdown in the motor driven power steering apparatus of the vehicle at a time point when a vehicle started to travel straight forwards at a speed of 80 KPH and turning of the vehicle was tried after 2 seconds.

As mentioned above, the conditions for detecting and determining no steering due to a breakdown of the motor driven power steering apparatus include a condition in which the motor torque is generated in a direction opposite to that of the steering torque of the driver, a condition in which the speed of the vehicle is a predetermined value (reference vehicle speed) or higher, a condition in which the magnitude of the motor torque is a predetermined value (reference torque) or higher, and a condition in which the change rate of the yaw rate is a predetermined value (reference change value) or lower are satisfied.

Referring to FIG. 4, it can be seen in the simulation result that as the motor driven power steering apparatus broke down at a point where 2 seconds elapsed after the vehicle started to travel straight forwards, a value obtained by adding a steering torque of the driver and a motor torque became 0 or less, the motor torque gradually increased to a predetermined magnitude or larger, and the change rate in the yaw rate became a predetermined value or lower.

Although not shown in FIG. 4, it can be seen in the simulation result that the speed of the vehicle was a predetermined value or larger.

In this way, it can be seen that no steering due to a breakdown of the motor driven power steering apparatus can be detected through the method of detecting a deviation of a travel path of a vehicle according to the related art.

Thus, it can be seen that when suitable reference vehicle speed, reference torque, and reference change rate are set as threshold values for the vehicle speed, the motor torque, and the change rate in the yaw rate, no steering of the vehicle can be detected without any error by applying the method according to the present disclosure.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of detecting a deviation of a travel path of a vehicle, the method comprising:
- a first step of determining, by an electronic control unit, whether a steering torque of a driver and a motor torque of a motor driven power steering apparatus have different directions;
- a second step, by the electronic control unit, of determining whether the vehicle travels at a predetermined speed or higher;
- a third step, by the electronic control unit, of determining whether the motor torque has a predetermined magnitude or larger; and
- a fourth step, by the electronic control unit, of determining whether a change rate of a yaw rate is a predetermined value or less,
- wherein when all the first, second, third and fourth steps are satisfied, it is determined by the electronic control unit that no steering of the vehicle occurs, and it is determined by the electronic control unit that the deviation of the travel path of the vehicle is generated and a motor for the motor driven power steering apparatus is switched off by interrupting a current supplied to the motor by the electronic control unit.

2. The method of claim 1, further comprising a fifth step of determining whether a Lane Keeping Assist System (LKAS) is normally operated when the LKAS is mounted to the vehicle.

3. The method of claim 1, wherein when all the first, second, third and fourth steps are satisfied, it is determined that the deviation of the travel path of the vehicle is generated when the driver generates the steering torque for turning.

4. The method of claim 1, wherein in the first step, when a value obtained by adding the steering torque of the driver and the motor torque is less than 0, it is determined that the steering torque of the driver and the motor torque have different directions.

5. The method of claim 1, wherein in the fourth step, when the motor torque has a predetermined magnitude or larger, it is determined that the vehicle travels straight forwards when the change rate of the yaw rate is the predetermined value or less.

6. The method of claim 1, wherein in the fourth step, when the motor torque has a predetermined magnitude or larger, it is determined that the vehicle travels straight forwards when a value obtained by differentiating the yaw rate is a predetermined value or less.

* * * * *